United States Patent Office 3,600,301
Patented Aug. 17, 1971

3,600,301
HYDROCARBON HYDROPROCESSING
Richard E. Rausch, Mundelein, Ill., assignor to Universal Oil Products Company, Des Plaines, Ill.
No Drawing. Continuation-in-part of application Ser. No. 819,114, Apr. 24, 1969. This application June 16, 1969, Ser. No. 833,664
Int. Cl. C10g *13/02*
U.S. Cl. 208—111                                    10 Claims

ABSTRACT OF THE DISCLOSURE

A process for hydroprocessing hydrocarbons and mixtures of hydrocarbons utilizing a catalytic composite of a porous carrier material, a rhenium component, a Group VIII noble metal component and a tin component, in which process there is effected a chemical consumption of hydrogen. A specific example of one such catalyst is a composite of a crystalline aluminosilicate, a platinum component, a rhenium component and a tin component, for specific utilization in a hydrocracking process. Other specific hydroprocesses include the hydrogenation of aromatic nuclei, the ring-opening of cyclic hydrocarbons, desulfurization, denitrification, hydrogenation, etc.

RELATED APPLICATION

The present application is a continuation-in-part of my copending application, Ser. No. 819,114, filed Apr. 24, 1969, all the teachings of which copending application are incorporated herein by specific reference thereto.

APPLICABILITY OF INVENTION

The present invention encompasses the use of a catalytic composite of a porous carrier material, a Group VIII noble metal component, a rhenium component and a tin component in the hydroprocessing of hydrocarbons and mixtures of hydrocarbons. As utilized herein, the term "hydroprocessing" is intended to be synonymous with a process which involves the conversion of hydrocarbons at conditions selected to effect a chemical consumption of hydrogen. Included within the processes intended to be encompassed by the term "hydroprocessing" include hydrocracking, aromatic hydrogenation, ring-opening, hydrorefining or hydrotreating (for nitrogen removal and olefin saturation), desulfurization (often included in hydrorefining) and hydrogenation, etc. As will be recognized, one common attribute of these processes, and the reactions being effected therein, is that they are all "hydrogen-consuming," and are, therefore, exothermic in nature.

The individual characteristics of the foregoing processes, including preferred operating conditions and techniques, will be hereinafter described in greater detail. The subject of the present invention is the use of a catalytic composite which has exceptional activity and resistance to deactivation when employed in a hydrogen-consuming process. Such processes require a catalyst having both a hydrogenation function and a cracking function. More specifically, the present process uses a dual-function catalytic composite which enables substantial improvements in those hydroprocesses that have traditionally used a dual-function catalyst. The particular catalytic composite constitutes a porous carrier material, a rhenium component, a Group VIII noble metal component and a tin component; for example, an improved hydrocracking process utilizes a crystalline aluminosilicate carrier material, a rhenium component, a platinum component and a tin component for improved activity, product selectivity and operational stability characteristics.

Composites having dual-function catalytic activity are widely employed in many industries for the purpose of accelerating a wide spectrum of hydrocarbon conversion reactions. Generally, the cracking function is thought to be associated with an acid-acting material of the porous, adsorptive refractory inorganic oxide type which is typically utilized as the carrier material for a metallic component from the metals, or compounds of metals, of Groups V through VIII of the Periodic Table, to which the hydrogenation function is generally attributed.

Catalytic composites are used to promote a wide variety of hydrocarbon conversion reactions such as hydrocracking, isomerization, dehydrogenation, hydrogenation, desulfurization, catalytic reforming, ring-opening, cyclization, aromatization, alkylation and transalkylation, polymerization, cracking, etc., some of which reactions are hydrogen-producing while others are hydrogen-consuming. It is to the latter group of reactions, hydrogen-consuming, that the present invention is directly applicable. In many instances, the commercial application of these catalysts is in processes where more than one of these reactions proceed simultaneously. An example of this type of process is a hydrocracking process wherein catalysts are utilized to effect (1) selective hydrogenation and (2) cracking of high molecular weight materials to produce a lower-boiling, more valuable product stream. Another such example would be the hydrogenative conversion of aromatic hydrocarbons into jet fuel components, principally straight, or slightly branched paraffins, involving (1) ring-opening and (2) hydrogenation.

Regardless of the reaction involved, or the particular process, it is very important that the catalyst exhibit not only the capability to perform its specified functions initially, but also perform them satisfactorily for prolonged periods of time. The analytical terms employed in the art to measure how efficient a particular catalyst performs its intended functions are activity, selectivity and stability. For the purpose of discussion, these terms are conveniently defined herein, for a given charge stock, as follows: (1) activity is a measure of the ability of the catalyst to convert a hydrocarbon feed stock into products at a specified severity level, where severity level alludes to the operating conditions employed—the temperature, pressure, LHSV and hydrogen concentration; (2) selectivity refers to the weight percent, or volume percent of the reactants that are converted into the desired product and/or products; (3) stability cannotes the rate of change of the activity and selectivity parameters with time—obviously, the smaller rate implying the more stable catalyst. With respect to a hydrogen-consuming process, for example hydrocracking, activity, stability and selectivity are similarly defined. Thus, "activity" cannotes the quantity of charge stock, boiling above a given temperature, which is converted to hydrocarbons boiling below the given temperature. "Selectivity" refers to the quantity of converted charge stock which boils below the desired end point of the product, as well as above a minimum specified intial boiling point. "Stability" cannotes the rate of change of activity and stability. Thus, for example, where a gas oil, boiling above about 650° F., is subjected to hydrocracking, "activity" cannotes the conversion of 650° F.-plus charge stock to 650° F.-minus product. "Selectivity" can, for example, allude to the quantity of conversion into gasoline boiling range hydrocarbons—i.e., pentanes and heavier, normally liquid hydrocarbon boiling up to about 400° F. "Stability" might be conveniently expressed in terms of temperature increase required during various increments of catalyst life, in order to maintain the desired activity.

As is well known to those skilled in the art, the principal cause of observed deactivation or instability of a dual-function catalyst is associated with the fact that coke forms on the surface of the catalyst during the course of the reaction. More specifically, in the various hydrocarbon conversion processes, and especially those which are categorized as hydrogen-consuming, the conditions utilized enhance the formation of high molecular weight, black, solid or semi-solid, hydrogen-poor carbonaceous material which coats the surface of the catalyst and reduces its activity by shielding its active sites from the reactants. Accordingly, a major problem facing workers in this area is the development of more active and selective catalytic composites that are not as sensitive to the presence of these carbonaceous materials and/or have the capability to suppress the rate of formation of these materials at the operating conditions employed.

I have now found a dual-function catalytic composite which possesses improved activity, selectivity and stability when employed in the hydroprocessing of hydrocarbons, especially wherein there is effected a chemical consumption of hydrogen. In particular, I have found that the use of a catalytic composite of a Group VIII noble metal component, a rhenium component and a tin component, with a porous carrier material, improves the overall operation of these hydrogen-consuming processes. Moreover, I have determined that a catalytic composite of a crystalline aluminosilicate carrier material, a rhenium component, a platinum component and tin component, when utilized in a process for hydrocracking hydrocarbonaceous material into lower-boiling hydrocarbon products, affords substantial improvement in performance and results. As indicated, the present invention essentially involves the use of a catalyst in which both a tin component and a rhenium component have been added to a dual-function conversion catalyst, enabling the performance characteristics of the process to be sharply and materially improved.

OBJECTS AND EMBODIMENTS

An object of the present invention is to afford a process for the hydroprocessing of a hydrocarbon, or mixtures of hydrocarbons. A corollary objective is to improve the selectivity and stability of hydroprocessing utilizing a highly active, rhenium component/tin component-containing, Group VIII noble metal catalytic composite.

A specific object of my invention resides in the improvement of hydrogen-consuming processes including hydrocracking, hydrorefining, ring-opening for jet fuel production, hydrogenation of aromatic hydrocarbons, desulfurization, denitrification, etc. Therefore, in one embodiment, the present invention encompasses a hydrocarbon hydroprocess which comprises reacting a hydrocarbon with hydrogen at conditions selected to effect chemical consumption of hydrogen and in contact with a catalytic composite of a Group VIII noble metal component, a rhenium component, a tin component and a porous carrier material. In another embodiment, the hydroprocessing conditions include a pressure of from 500 to about 5,000 p.s.i.g., a LHSV (defined as volumes of liquid hydrocarbon charge per hour per volume of catalyst disposed in the reaction zone) of from 0.1 to about 10.0, a hydrogen concentration of from 1,000 to about 50,000 s.c.f./bbl. and a maximum catalyst temperature of from 200° F. to about 900° F., and, where applicable, a combined liquid feed ratio of 1.1 to about 6.0.

In another embodiment, the process is further characterized in that the catalytic composite is reduced and sulfided prior to contacting the hydrocarbon feed stream. In still another embodiment, my invention involves a process for hydrogenating a coke-forming hydrocarbon distillate containing di-olefinic and mono-olefinic hydrocarbons and aromatics, which process comprises reacting said distillate with hydrogen, at a temperature below about 500° F., in contact with a catalytic composite of an alumina-containing refractory inorganic oxide, a rhenium component, a Group VIII noble metal component, an alkali metal component and a tin component, and recovering an aromatic/mono-olefinic hydrocarbon concentrate substantially free from conjugated di-olefinic hydrocarbons.

Another embodiment affords a hydrocracking catalyst comprising a substantially pure faujasite carrier material, at least about 90.0% by weight of which is zeolitic, a rhenium component, a Group VIII noble metal component and a tin component.

Other objects and embodiments of my invention relate to additional details regarding preferred catalytic ingredients, the concentration of components in the catalytic composite, methods of catalyst preparation, individual operating conditions for use in the various hydrotreating processes, preferred processing techniques and the like particulars which are hereinafter given in the following, more detailed description of my invention.

SUMMARY OF INVENTION

As hereinabove set forth, the present invention involves the hydroprocessing of hydrocarbons and mixtures of hydrocarbons, utilizing a particular catalytic composite. This catalyst comprises a porous carrier material having combined therewith a rhenium component, a Group VIII noble metal component and a tin component; in many applications, the catalytic composite will also contain a halogen component, and in some select applications, an alkali metal or alkaline-earth metal component. Considering first the porous carrier material, it is preferred that it be a porous, adsorptive, high surface area support having a surface area of about 25 to about 500 square meters per gram. The porous carrier material is necessarily refractory with respect to the operating conditions employed in the particular hydrocarbon hydroprocess, and it is intended to include carrier materials which have traditionally been utilized in dual-function hydrocarbon conversion catalyst. In particular, suitable carrier materials are selected from the group of amorphous refractory inorganic oxides including alumina, titania, zirconia, chromia, magnesia, thoria, boria, silica-alumina, silica-magnesia, chromia-alumina, alumina-boria, alumina-silica-boron phosphate, silica-zirconia, etc. When of the amorphous type, the preferred carrier material is a composite of alumina and silica with silica being present in an amount of about 10.0% to about 90.0% by weight.

In many hydroprocessing applications of the present invention, particularly hydrocracking heavy hydrocarbonaceous material to produce lower-boiling hydrocarbon products, the carrier material will constitute a crystalline aluminosilicate, often referred to as being zeolitic in nature. This may be naturally-occurring, or synthetically-prepared, and includes mordenite, faujasite, Type A or Type U molecular sieves, etc. When utilized as the carrier material, the zeolitic material may be in the hydrogen form, or in a form which has been treated with multivalent cations.

As hereinabove set forth, the porous carrier material, for use in the process of the present invention, is a refractory inorganic oxide, either alumina in and of itself, or in combination with one or more other refractory inorganic oxides, and particularly in combination with silica. When utilized as the sole component of the carrier material, the alumina may be of the gamma-, eta-, or theta-alumina type, with gamma- or eta-aluminum giving the best results. In addition, the preferred carrier materials have an apparent bulk density of about 0.30 to about 0.70 gm./cc. and surface area characteristics such that the average pore diameter is about 20 to about 300 angstroms, the pore volume is about 0.10 to about 1.0 ml./gm. and the surface area is about 100 to about 500 square meters per gram. Whatever type of refractory inorganic oxide is employed, it may be activated prior to use by one or more treatments including drying, calcination, steaming, etc. For example, the alumina carrier may be prepared by adding a suitable alkaline reagent, such as ammonium hydroxide, to a salt of aluminum, such as aluminum chloride, aluminum nitrate, etc., in an amount to form an aluminum hydroxide gel which, upon drying and calcination, is converted to alumina. The carrier material may be formed into any desired shape such as spheres, pills, cakes, extrudates, powders, granules, etc., and may further be utilized in any desired size.

When a crystalline aluminosilicate, or zeolitic material, is intended for use as the carrier, it may be prepared in a number of ways. One common way is to mix solutions of sodium silicate, or colloidal silica, and sodium aluminate, and allow these solutions to react to form a solid crystalline aluminosilicate. Another method is to contact a solid inorganic oxide, from the group of silica, alumina, and mixtures thereof, with an aqueous treating solution containing alkali metal cations (preferably sodium) and anions selected from the group of hydroxyl, silicate and aluminate, and allow the solid-liquid mixture to react until the desired crystalline aluminosilicate has been formed. One particular method is especially preferred when the carrier material is intended to be a crystalline aluminosilicate. This stems from the fact that the method produces a carrier material of substantially pure crystalline aluminosilicate particles. In employing the term "substantially pure," the intended connotation is an aggregate particle at least 90.0% by weight of which is zeolitic. Thus, the carrier is distinguished from an amorphous carrier material, or prior art pills and/or extrudates in which the zeolitic material might be dispersed within an amorphous matrix, with the result that only about 40.0% to about 70.0% by weight of the final particle is zeolitic. The preferred method of preparing the carrier material produces a crystalline aluminosilicate of the faujasite modification, and utilizes aqueous solutions of colloidal silica and sodium aluminate. Colloidal silica is a suspension in which the suspended particles are present in very finely-divided form—i.e. having a particle size from about 1 to about 500 millimicrons in diameter. The type of crystalline aluminosilicate which is produced is primarily dependent upon the conditions under which crystallization occurs, with the $SiO_2/Al_2O_3$ ratio, the $NaO_2/SiO_2$ ratio, the $H_2O/Na_2O$ ratio, temperature and time being the important variables.

After the solid crystalline aluminosilicate has been formed, the mother liquor is separated from the solids by methods such as decantation or filtration. The solids are water-washed and filtered to remove undesirable ions, and are then reslurried in water to a solids concentration of about 5.0% to about 50.0%. The cake and the water are violently agitated and homogenized until the agglomerates are broken and the solids are uniformly dispersed in what appears to be a colloidal suspension. The suspension is then spray dried by conventional means such as pressurizing the suspension through an orifice into a hot, dry chamber. The solid particles are withdrawn from the drying chamber and are suitable for forming into finished particles of desired size and shape. The preferred form of the finished particle is a cylindrical pill, and these may be prepared by introducing the spray-dried particles directly into a pilling machine without the addition of any extraneous lubricant or binder. The pilling machines are adjusted to produce particles having a crushing strength of from 2 to 20 pounds, and preferably from 5 to 15 pounds. The pilled faujasite carrier material, of which at least about 90.0% by weight is zeolitic, is activated catalytically by converting the sodium form either to the divalent form, the hydrogen form or both.

An essential constituent of the catalytic composite used in the hydrocarbon hydroprocessing scheme of the present invention is a tin component. This component may be present as an elemental metal or as a chemical compound such as the oxide, sulfide, halide, etc. This component may be incorporated in the catalytic composite in any suitable manner such as by co-precipitation or co-gellation with the porous carrier material, ion-exchange with the carrier material or impregnation of the carrier material at any stage in the preparation. One method involves co-precipitating the tin component during the preparation of the refractory oxide carrier material. This involves the addition of suitable soluble tin compounds, such as stannous or stannic halide, to the hydrosol, and then combining the hydrosol with a suitable gelling agent, and dropping the resulting mixture into an oil bath. Following the calcination step, there is obtained a carrier material comprising an intimate combination of the refractory inorganic oxide and stannic oxide. Another method of incorporating the tin component involves the use of a water-soluble compound of tin to impregnate the porous carrier material. Thus, the tin component may be added to the carrier material by commingling the latter with an aqueous solution of a suitable tin salt or water-soluble compound of tin such as stannous bromide, stannous chloride, stannic chloride, stannic chloride pentahydrate, stannic chloride tetrahydrate, stannic chloride trihydrate, stannic chloride diamine, stannic trichloride bromide, stannic chromate, stannous fluoride, stannic fluoride, stannic iodide, stannic sulfate, stannic tartrate, and similar compounds. The utilization of a tin chloride compound, such as stannous or stannic chloride, is preferred since it facilitates the incorporation of both the tin component and at least a minor amount of the halogen component in a single step. In general, the tin component can be impregnated either prior to, simultaneously with, or after the Group VIII noble metal component, and/or rhenium component is added to the carrier material. It appears, however, that significantly improved processing results are obtained when the tin component is impregnated simultaneously with the rhenium and Group VIII nobel metal components. It has been determined that a preferred impregnation solution contains chloroplatinic acid perrhenic acid, hydrogen chloride, and stannous or stannic chloride, in an amount to incorporate from 0.01% to about 5.0% by weight of a tin component, as the elemental metal. Regardless of the details of how the components of the catalyst are combined with the carrier material, the final composite will generally be dried at a temperature of about 200° F. to about 600° F., for a period of from about 2 to about 24 hours or more, and finally calcined at a temperature of about 700° F. to about 1100° F. in an atmosphere of air, for a period of about 0.5 to about 10 hours in order to convert the metallic components substantially to the oxide form.

The catalyst for use in the process of the present invention also contains a Group VIII noble metal component. Although the process of the present invention is specifically directed to the use of a catalytic composite containing platinum, it is intended to include other Group VIII noble metals such as palladium, rhodium, ruthenium, osmium and iridium. The Group VIII noble metal component, for example platinum, may exist within the final catalytic composite as a compound such as an oxide, sulfide, halide, etc., or in an elemental state. The Group VIII noble metal component generally comprises about 0.01% to about 1.0% by weight of the final composite, calculated on an elemental basis. Excellent results are obtained when the catalyst contains about 0.3% to about 0.9% by weight of the platinum group metal. In addition to platinum, another particularly preferred Group VIII noble metal component is palladium, or a compound of palladium.

The Group VIII noble metal component may be incorporated within the catalytic composite in any suitable manner including co-precipitation or co-gellation with the carrier material, ion-exchange, or impregnation. A preferred method of preparation involves the utilization of a water-soluble compound of a Group VIII noble metal component in an impregnation technique. Thus, the platinum component may be added to the carrier material by commingling the latter with an aqueous solution of chloroplatinic acid. Other water-soluble compounds of platinum may be employed, and include ammonium chloroplatinate, platinum chloride, dinitro-diamino platinum, etc. In addition it is generally preferred to impregnate the carrier material after it has been calcined in order to minimize the risk of washing away the valuable platinum metal compounds; however, in some instances, it may be advantageous to impregnate the carrier material when it is in a gelled state. Following impregnation, the impregnated carrier is dried and subjected to a high temperature calcination, or oxidation technique as hereinabove set forth.

Yet another component of the catalyst used in the process of the present invention is a rhenium component. This component may be present as an elemental metal, as a chemical compound such as the oxide, sulfide, halide, etc., or as a physical or chemical combination with the porous carrier material and/or other components of the catalytic composite. The rhenium component is preferably utilized in an amount sufficient to result in a final catalytic composite containing about 0.01 to about 1.0% by weight rhenium, calculated on an elemental basis. The rhenium component may be incorporated in the catalytic composite in any suitable manner and at any stage in the preparation of the catalyst. It is generally advisable to incorporate the rhenium component after the porous carrier material has been formed in order that the expensive metal will not be lost due to washing and purification treatments which may be applied to the carrier material during the course of its preparation. Although any suitable method for incorporating a catalytic component in a porous carrier material can be utilized to incorporate the rhenium component, the preferred procedure involves impregnation of the porous carrier material. The impregnation solution can, in general, be a solution of a suitable soluble, decomposable rhenium salt such as ammonium perrhenate, sodium perrhenate, potassium perrhenate, and the like salts. In addition, solutions of rhenium halides such as rhenium chloride may be used; the preferred impregnation solution is, however, an aqueous solution of perrhenic acid. The porous carrier material can be impregnated with the rhenium component either prior to, simultaneously with, or after the other components mentioned herein are combined therewith. Best results are ordinarily achieved when the rhenium component is impregnated simultaneously with the Group VIII noble metal component.

Regarding the preferred amounts of the various metallic components of the subject catalyst, it is good practice to specify the amounts of the rhenium component and of the tin component as a function of the amount of the Group VIII noble metal component. On this basis, the amount of the rhenium component is ordinarily selected so that the atomic ratio of the Group VIII noble metal to rhenium contained in the composite is about 0.05:1 to about 2.75:1 with the preferred range being about 0.25:1 to about 2.0:1. Similarly, the amount of the tin component is ordinarily selected to produce a composite containing an atomic ratio of the Group VIII noble metal to tin of about 0.1:1 to about 3:1 with the preferred range being about 0.5:1 to about 1.5:1.

Another significant parameter for the catalyst is the "total metals content" which is defined to be the sum of the platinum group component, the rhenium component, and the tin component, calculated on an elemental tin, rhenium, and platinum group metal basis. Good results are ordinarily obtained with the subject catalyst when this parameter is fixed at a value of about 0.03 to about 7.0 wt. percent with best results ordinarily achieved at a metals loading of about 0.15 to about 2.0 wt. percent.

Considering the above discussion of each of the essential and preferred components of the catalytic composite, it is evident that a preferred catalytic composite comprises a combination of a platinum component, a rhenium component and a tin component, in amounts sufficient to result in a composite containing about 0.01% to about 1.0% by weight of platinum, about 0.01% to about 1.0% by weight of rhenium, and about 0.01% to about 5.0% by weight of tin. Accordingly, specific examples of especially preferred catalytic composites are as follows: (1) a catalytic composite comprising a combination of 0.5 wt. percent tin, 0.5 wt. percent rhenium and 0.75 wt. percent platinum; (2) a catalytic composite comprising a combination of 0.1 wt. percent tin, 0.1 wt. percent rhenium and 0.1 wt. percent platinum; (3) a catalytic composite comprising a combination of about 0.375 wt. percent tin, 0.375 wt. percent rhenium and 0.375 wt. percent platinum; (4) a catalytic composite comprising a combination of 0.12 wt. percent tin, 0.1 wt. percent rhenium and 0.2 wt. percent platinum; (5) a catalytic composite comprising a combination of 0.25 wt. percent tin, 0.25 wt. percent platinum and 0.25 wt. percent rhenium; and, (6) a catalytic composite comprising a combination of 0.2 wt. percent tin, 0.2 wt. percent rhenium and 0.2 wt. percent platinum. The amounts of the components in these specific examples are, of course, calculated on an elemental basis.

Although not essential to successful hydroprocessing in all cases, in fact detrimental in some, a halogen component may be incorporated into the catalytic composite. Although the precise form of the chemistry of the association of the halogen component with the carrier material and metallic component is not accurately known, it is customary in the art to refer to the halogen component as being combined with the carrier material, or with the other ingredients of the catalyst. The combined halogen may be either fluorine, chlorine, iodine, bromine, or mixtures thereof. Of these, fluorine and particularly chlorine are preferred for some of the hydrocarbon hydroprocesses encompassed by the present invention. The halogen may be added to the carrier material in any suitable manner, and either during preparation of the carrier or before, or after, the addition of the other components. For example, the halogen may be added at any stage in the preparation of the carrier material, or to the calcined carrier material, and as an aqueous solution of an acid such as hydrogen fluoride, hydrogen chloride, hydrogen bromide, hydrogen iodide, etc. The halogen component or a portion thereof may be composited with the carrier material during the impregnation of the latter with the metal components. The hydrosol, which is typically utilized to form an amorphous carrier material, may contain halogen and thus contribute at least a portion of the halogen component to the final composite. The quantity of halogen is such that the final catalytic composite contains about 0.1% to about 1.5% by weight, and preferably from about 0.5% to about 1.2%, calculated on an elemental basis.

When used in many of the hydrogen-consuming processes hereinbefore described, the foregoing quantities of metallic components will be combined with a carrier material of alumina and silica, wherein the silica concentration is 10.0% to about 90.0% by weight. In those processes wherein the acid function of the catalytic composite must necessarily be attenuated, the metallic components will be combined with a carrier material consisting essentially of alumina. In this latter situation, a halogen component is not combined with the catalytic composite, and, the inherent acid function of Group VIII noble metals is further attenuated through the addition of from 0.01% to about 1.5% by weight of an alkalinous metal component.

One such process, in which the acid function of the catalyst employed must necessarily be attenuated, is the process wherein an aromatic hydrocarbon is hydrogenated to produce the corresponding cycloparaffin. Specifically, a benzene-concentrate is often used as the starting material for the production of cyclohexane primarily to satisfy the demand therefor in the manufacture of nylon. In order to avoid ring-opening which results in loss of both the benzene and the cyclohexane product, an alkalinous metal component is combined with the catalytic composite in an amount of from 0.01% to about 1.5% by weight. This component is selected from the group of lithium, sodium, potassium, rubidium, cesium, barium, strontium, calcium, magnesium, beryllium, mixtures of two or more, etc. In general, more advantageous results are achieved through the use of the alkali metals, particularly lithium and/or potassium.

In those instances where a halogen component is utilized in the catalyst, it has been determined that more advantageous results are obtained when the halogen content of the catalyst is adjusted during the calcination step through the inclusion of a halogen, or a halogen-containing compound in the air atmosphere. In particular, when the halogen component of the catalyst is chlorine, for example, it is preferred to use a mole ratio of water to hydrochloric acid of about 20:1 to about 100:1 during at least a portion of the calcination step in order to adjust the final chlorine content of the composite to a range of about 0.5 to about 1.2% by weight.

Prior to its use in the hydroprocessing of hydrocarbons, the calcined catalytic composite may be subjected to a substantially water-free reduction technique. This technique is designed to insure a uniform and finely-divided dispersion of the metallic components throughout the carrier material. Preferably, substantially pure and dry hydrogen (i.e. less than about 30.0 volume p.p.m. of water) is employed as the reducing agent. The calcined catalyst is contacted at a temperature of about 800° F. to about 1200° F., and for a period of time of about 0.5 to about 10 hours, or more. This reduction technique may be performed in situ as part of a start-up sequence provided precautions are observed to pre-dry the unit to a substantially water-free state.

Again, with respect to effecting hydrogen-consuming reactions, the process is generally improved when the reduced composite is subjected to a presulfiding operation designed to incorporate from about 0.05 to about 0.50% by weight of sulfur, on an elemental basis, in the catalytic composite. This presulfiding treatment takes place in the presence of hydrogen and a suitable sulfur-containing compound including hydrogen sulfide, lower molecular weight mercaptans, organic sulfides, etc. The procedure constitutes treating the reduced catalyst with a sulfiding gas, such as a mixture of hydrogen and hydrogen sulfide having about 10 moles of hydrogen per mole of hydrogen sulfide, and at conditions sufficient to effect the desired incorporation of sulfur. These conditions include a temperature ranging from about 50° F. up to about 1100° F.

According to the present invention, a hydrocarbon charge stock and hydrogen are contacted with a catalyst of the type described above in a hydrocarbon conversion zone. The particular catalyst employed is dependent upon the characteristics of the charge stock as well as the desired end result. The contacting may be accomplished by using the catalyst in a fixed-bed system, a moving-bed system, a fluidizing-bed system, or in a batch-type operation; however, in view of the risk of attrition losses, it is preferred to use the fixed-bed system. Furthermore, it is well known that a fixed-bed catalytic system offers many operation advantages. In this type of system, a hydrogen-rich gas and the charge stock are preheated by any suitable heating means to the desired temperature, and then are passed into a conversion zone containing the fixed-bed of the catalytic composite. It is understood, of course, that the conversion zone may be one or more separate reactors having suitable means therebetween to insure that the desired conversion temperature is maintaind at the entrance to each reactor. It is also to be noted that the reactants may be contacted with the catalyst bed in either upward, downward, or radial flow fashion, with the latter being preferred. Additionally, the reactants may be in the liquid phase, a mixed liquid-vapor phase, or a vapor phase when they contact the catalyst.

The operating conditions imposed upon the reaction zones are dependent upon the particular hydrocarbon hydroprocess being effected. However, these operating conditions will include a pressure from about 400 to about 5,000 p.s.i.g., a liquid hourly space velocity of about 0.1 to about 10.0, and a hydrogen concentration within the range of about 1,000 to about 50,000 s.c.f./bbl. In view of the fact that the reactions being effected are exothermic in nature, an increasing temperature gradient is experienced as the hydrogen and feed stock traverse the catalyst bed. For any given hydrogen-consuming process, it is desirable to maintain the maximum catalyst bed temperature below about 900° F., which temperature is virtually identical to that as conveniently measured at the outlet of the reaction zone. Hydrogen-consuming processes are conducted at a catalyst temperature in the range of about 200° F. to about 900° F., and it is intended herein that the stated temperature of operation alludes to the maximum catalyst bed temperature. In order to assure that the catalyst bed temperature does not exceed the maximum allowed for a given process, the use of conventional quench streams, either normally liquid or gaseous, introduced at one or more intermediate loci of the catalyst bed, may be utilized. In some of the hydrocarbon hydroprocesses encompassed by the present invention, and especially where hydrocracking a heavy hydrocarbonaceous material to produce lower-boiling hydrocarbon products, that portion of the normally liquid product effluent boiling above the end point of the desired product will be recycled to combine with the fresh hydrocarbon charge stock. In these situations, the combined liquid feed ratio (defined as volumes of total liquid charge to the reaction zone per volume of fresh feed charge to the reaction zone) will be within the range of about 1.1 to about 6.0.

Specific operating conditions, processing techniques, particular catalytic composites and other individual process details will be given in the following detailed description of several of the hydrocarbon hydroprocesses to which the present invention is applicable. These will be presented by way of examples given in conjunction with commercially-scaled operating units. In presenting these examples, it is not intended that the invention be limited to the specific illustrations, nor is it intended that a given process be limited to the particular operating conditions, catalytic composite, processing techniques, charge stock, etc. It is understood, therefore, that the present invention is merely illustrated by the specifics hereinafter set forth.

ILLUSTRATIVE EXAMPLES

Example I

In this example, the present invention is illustrated as applied to the hydrogenation of aromatic hydrocarbons such as benzene, toluene, the various xylenes, naphthalenes, etc., to form the corresponding cyclic paraffins. When applied to the hydrogenation of aromatic hydrocarbons, which are contaminated by sulfurous compounds, primarily thiophenic compounds, the process is advantageous in that it affords 100.0% conversion without the necessity for the substantially complete prior removal of the sulfur compounds. The corresponding cyclic paraffins, resulting from the hydrogenation of the aromatic nuclei, include compounds such as cyclohexane, mono-, di-, tri-substituted cyclohexanes, decahydronaphthalene, tetrahydronaphthalene, etc., which find widespread use in a variety of commercial industries in the manufacture of nylon, as a solvent for various fats, oils, waxes, etc.

Aromatic concentrates are obtained by a multiplicity of techniques. For example, a benzene-containing fraction may be subjected to distillation to provide a heart-cut which contains the benzene. This is then subjected to a solvent extraction process which separates the benzene from the normal or iso-paraffinic components, and the naphthenes contained therein. Benzene is readily recovered from the selected solvent by way of distillation, and in a purity of 99.0%, or more. Heretofore, the hydrogenation of aromatic hydrocarbons, for example benzene, has been effected with a nickel-containing catalyst at hydrogenation conditions. This is disadvantageous in many respects, especially from the standpoint that nickel is quite sensitive to sulfurous compounds which may be contained in the benzene concentrate. In accordance with the present process, the benzene is hydrogenated in contact with a non-acidic catalytic composite containing 0.1% to about 1.0% by weight of a group VIII noble metal component, from about 0.01% to about 1.0% by weight of a rhenium component, from about 0.01% to about 5.0% by weight of a tin component and from about 0.01% to about 1.5% by weight of an alkalinous metal component. Operating conditions include a maximum catalyst bed temperature in the range of about 200° F. to about 800° F., a pressure of from 500 to about 2,000 p.s.i.g., a liquid hourly space velocity of about 1.0 to about 10.0 and a hydrogen concentration in an amount sufficient to yield a mole ratio of hydrogen to cyclohexane, in the product effluent from the last reaction zone, not substantially less than about 4.0:1. Although not essential, one preferred operating technique involves the use of three reaction zones, each of which contains approximately one-third of the total quantity of catalyst employed. The process is further facilitated when the total fresh benzene is added in three approximately equal portions, one each to the inlet of each of the three reaction zones. While the benzene, therefore, passes in parallel flow through the reaction zones, the hydrogen and cyclohexane recycle passes in series flow through the reaction zones.

The catalyst utilized is a substantially halogen-free alumina carrier material combined with about 0.5% by weight of tin, 0.25% by weight of rhenium, 0.375% by weight of platinum, and about 0.50% by weight of lithium, all of which are calculated on the basis of the elemental metals. The hydrogenation process will be described in connection with a commercially-scaled unit having a fresh benzene feed capacity of about 750 bbl./day. In the instant illustration, the total fresh benzene feed rate is about 542 bbl./day, of which 190 barrels is utilized to remove toluene and other alkylbenzenes from a make-up hydrogen stream in an absorber. The toluene-free make-up gas is then admixed with about 700 bbl./day of a cyclohexane-rich product recycle stream, the mixture being introduced into the first of a series of three reaction zones.

On a moles per hour basis, the total fresh benzene feed constitutes 89.53 moles per hour, of which 32.0 moles per hour is utilized in the make-up gas absorber. This make-up gas, being introduced into the system from a hydrodealkylation process, contains about 4.76 moles per hour of benzene. The make-up gas from the absorber, being transmitted to the hydrogenation unit, and being combined, as above set forth, with a cyclohexane-rich product recycle, contains 7.10 moles per hour of benzene. Of the 57.53 moles per hour of fresh benzene feed, 18.67 moles per hour are introduced into the first reaction zone. Following suitable heat-exchange with various hot effluent streams, the total feed to the first reaction zone is at a temperature of 390° F. and a pressure of 490 p.s.i.g. The reaction zone effluent is at a temperature of 595° F. and a pressure of about 485 p.s.i.g. The total effluent from the first reaction zone is utilized as a heat-exchange medium, in a steam generator, whereby the temperature is reduced to a level of about 445° F. The cooled effluent is admixed with about 27.23 moles per hour of fresh benzene feed, at a temperature of 100° F.; the resulting temperature is 390° F., and the mixture enters the second reaction zone at a pressure of about 475 p.s.i.g. The second reaction zone effluent, at a pressure of 470 p.s.i.g. and a temperature of 600° F., is also utilized as a heat-exchange medium to generate steam, whereby the temperature is reduced to a level of about 415° F. Upon being admixed with an additional 11.63 moles per hour of fresh benzene feed, the temperature is again 390° F., and the mixture enters the third reaction zone at a pressure of about 460 p.s.i.g. The third reaction zone effluent is at a temperature of about 480° F. and a pressure of about 455 p.s.i.g. Through utilization as a heat-exchange medium, the temperature is reduced to a level of about 200° F., and subsequently reduced to a level of about 100° F. through the use of an air-cooled condenser. The cooled third reaction zone effluent is introduced into a high pressure separator, at a pressure of about 420 p.s.i.g.

A hydrogen-rich vaporous phase is withdrawn from the high pressure separator and recycled by way of compressive means, at a pressure of about 490 p.s.i.g., to the inlet of the first reaction zone. A portion of the normally liquid phase is recycled to the first reaction zone as the cyclohexane concentrate hereinbefore described. The remainder of the normally liquid phase is passed into a stabilizing column functioning at an operating pressure of about 250 p.s.i.g., a top temperature of about 160° F. and a bottom temperature of about 430° F. The cyclohexane product is withdrawn from the stabilizer as a bottoms stream, the overhead stream being vented to fuel. The cyclohexane concentrate is recovered in an amount of about 64.10 moles per hour, of which only about 0.10 mole per hour constitutes other hexanes. In brief summation, of the 4,800 pounds per hour of fresh benzene feed (including about 386 pounds per hour in the make-up hydrogen stream), 5,400 pounds per hour of cyclohexane product is recovered.

Example II

Another hydrocarbon hydroprocessing scheme, to which the present invention is applicable, involves the hydrorefining of coke-forming hydrocarbon distillates. These hydrocarbon distillates are generally sulfurous in nature, and contain mono-olefinic, di-olefinic and aromatic hydrocarbons. Through the utilization of a catalytic composite comprising both a rhenium component and a tin component, coupled with a Group VIII noble metal component, increased selectivity and stability of operation is obtained; selectivity is most noticeable with respect to the retention of aromatics, and in hydrogenating conjugated di-olefinic and mono-olefinic hydrocarbons. Such charge stocks generally result from diverse conversion processes including the catalytic and/or thermal cracking of petroleum, sometimes referred to as pyrolysis, the destructive distillation of wood or coal, shale oil retorting, etc. The impurities in these distillate fractions must necessarily be removed before the distillates are suitable for their intended use, or which when removed, enhance the value of the distillate fraction for further processing. It is intended that these charge stocks be substantially desulfurized, saturated to the extent necessary to remove the conjugated di-olefins, while simultaneously retaining the aromatic hydrocarbons. When subjected to hydrorefining for the purpose of removing the contaminating influences, there is encountered difficulty in effecting a desired degree of reaction due to the formation of coke and other carbonaceous material.

As utilized herein, "hydrogenating" is intended to be synonymous with "hydrorefining." The purpose is to provide a highly selective and stable process for hydrogenating coke-forming hydrocarbon distillates, and this is accomplished through the use of a fixed-bed catalytic reaction system utilizing a catalyst comprising a tin component, a Group VIII noble metal component and a rhenium component. There exist two separate, desirable routes for the treatment of coke-forming distillates, for example, a pyrolysis naphtha by-product. One such route is directed toward a product suitable for use in certain gasoline blending. With this as the desired object, the process can be effected in a single stage, or reaction zone, with the catalytic composite hereinafter specifically described as the first-stage catalyst. The attainable selectivity in this instance resides primarily in the hydrogenation of highly reactive double bonds. In the case of conjugated di-olefins, the selectivity afforded restricts the hydrogenation to produce mono-olefins, and, with respect to the styrenes, for example, the hydrogenation is inhibited to produce alkyl benzenes without "ring" saturation. The selectivity is accomplished with a minimum of polymer formation either to "gums," or polymers of lower molecular weight which would necessitate a rerunning of the product before blending to gasoline would be feasible. Other advantages of restricting the hydrogenation of the conjugated di-olefins and styrenes include: lower hydrogen consumption, lower heat of reaction and a higher octane rating gasoline boiling range product effluent. Also, the non-conjugated di-olefins, such as 1,5 normal hexadiene are not unusually offensive in suitably inhibited gasolines in some locales, and will not react in tihs first stage. Some fresh charge stocks are sufficiently low in mercaptan sulfur content that direct gasoline blending may be considered, atlhough a mild treatment for mercaptan sulfur removal might be necessary. Such considerations are generally applicable to foreign markets, particularly European, where olefinic and sulfur-containing gasolines are not too objectionable. It must be noted that the sulfurous compounds, and the mono-olefins, whether virgin or products of di-olefin partial saturation, are unchanged in the single, or first-stage reaction zone. Where, however, the desired end result is aromatic hydrocarbon retention, intended for subsequent extraction, the two-stage route is required. The mono-olefins must be substantially saturated in the second stage to facilitate aromatic extraction by way of currently utilized methods. Thus, the desired necessary hydrogenation involves saturation of the mono-olefins, as well as sulfur removal, the latter required for an acceptable ultimate aromatic product. Attendant upon this is the necessity to avoid even partial saturation of aromatic nuclei.

With respect to one catalytic composite, its principal function involves the selective hydrogenation of conjugated di-olefinic hydrocarbons to mono-olefinic hydrocarbons. This particular catalytic composite possesses unusual stability notwithstanding the presence of relatively large quantities of sulfurous compounds in the fresh charge stock. The catalytic composite comprises an alumina-containing refractory inorganic oxide, a rhenium component, a tin component, a Group VIII noble metal component and an alkali-metal component, the latter being preferably potassium and/or lithium. It is especially preferred, for use in this particular hydrocarbon hydro-processing scheme, that the catalytic composite be substantially free from any "acid-acting" propensities. The catalytic composite, utilized in the second reaction zone for the primary purpose of effecting the destructive conversion of sulfurous compounds into hydrogen sulfide and hydrocarbons, is a composite of an alumina-containing refractory inorganic oxide, a rhenium cmponent, a Group VIII noble metal component and a tin component. Through the utilization of a particular sequence of processing steps, and the use of the foregoing described catalytic composites, the formation of high molecular weight polymers and co-polymers is inhibited to a degree which permits processing for an extended period of time. Briefly, this is accomplished by initiating the hydrorefining reactions at maximum catalyst temperatures below about 500° F., at which temperature the coke-forming reactions are not promoted. The operating conditions within the second reaction zone are such that the sulfurous compounds are removed without incurring the detrimental polymerization reactions otherwise resulting were it not for the saturation of the conjugated di-olefinic hydrocarbons within the first reaction zone.

The hydrocarbon distillate charge stock, for example, a light naphtha by-product from a commercial cracking unit designed and operated for the production of ethylene, having a gravity of about 40.0° API, a bromine number of about 45.7, a diene value of about 35.1 and containing about 400 p.p.m. by weight of sulfur and 73.0 vol. percent aromatic hydrocarbons, is admixed with recycled hydrogen. The hydrogen concentration is within the range of from about 1,000 to about 10,000 s.c.f./bbl., and preferably in the narrower range of from 1,500 to about 6,000 s.c.f./bbl. The charge stock is heated to a temperature such that the maximum catalyst temperature is in the range of from about 200° F. to about 500° F., by way of heat-exchange with various product effluent streams, and is introduced into the first reaction zone at an LHSV in the range of about 0.5 to about 10.0. The reaction zone is maintained at a pressure of from 400 to about 1,000 p.s.i.g., and preferably at a level in the range of from 500 p.s.i.g. to about 900 p.s.i.g.

The temperature of the product effluent from the first reaction zone is increased to a level above about 500° F., and preferably to result in a catalyst temperature in the range of 600° F. to 900° F. When the process is functioning efficiently, the diene value of the liquid charge entering the second catalytic reaction zone is less than about 1.0 and often less than about 0.5. The conversion of nitrogenous and sulfurous compounds, and the saturation of mono-olefins, contained within the first zone effluent, is effected in the second zone. The second catalytic reaction zone is maintained under an imposed pressure of from about 400 to about 1,000 p.s.i.g., and preferably at a level of from about 500 to about 900 p.s.i.g. The two-stage process is facilitated when the focal point for pressure control is the high pressure separator serving to separate the product effluent from the second catalytic reaction zone. It will, therefore, be maintained at a pressure slightly less than the first catalytic reaction zone, as a result of fluid flow through the system. The liquid hourly space velocity through the second reaction zone is about 0.5 to about 10.0, based upon fresh feed only. The hydrogen concentration will be in a range of from 1,000 to about 10,000 s.c.f./bbl. Series-flow through the entire system is facilitated when the recycle hydrogen is admixed with the fresh hydrocarbon charge stock. Make-up hydrogen, to supplant that consumed in the overall process, may be introduced from any suitable external source, but is preferably introduced into the system by way of the effluent line from the first catalytic reaction zone to the second catalytic reaction zone.

With respect to the naphtha boiling range portion of the product effluent, the sulfur concentration is less than about 1.0 p.p.m., the aromatic concentration is about 72.2% by volume, the bromine number is less than about 0.5 and the diene value is essentially "nil."

With charge stocks having exceedingly high diene values, a recycle diluent is employed in order to prevent an excessive temperature rise in the reaction system. Where so utilized, the source of the diluent is preferably a portion of the normally liquid product effluent from the second catalytic reaction zone. The precise quantity of recycle material varies from feed stock to feed stock; however, the rate at any given time is conveniently controlled by monitoring the diene value of the combined liquid feed to the first reaction zone. As the diene value exceeds a level of about 25.0, the quantity of recycle is increased, thereby increasing the combined liquid feed ratio; when the diene value approaches a level of about 20.0, or less, the quantity of recycle diluent may be lessened, thereby decreasing the combined liquid feed ratio.

Another pyrolysis gasoline, having a gravity of about 52.0° API, containing 250 p.p.m. by weight of sulfur, 72.5% by volume of aromatics, and having a bromine number of 107 and a diene value of 124, is initially processed in a first reaction zone containing a catalytic composite of alumina, 0.5% by weight of lithium, 0.375% by weight of palladium, 0.375% by weight of rhenium and 0.20% by weight of tin, calculated as the elements. The fresh feed charge rate is 9,500 bbl./day, and this is admixed with 47,500 bbl./day of a normally liquid diluent. Based upon fresh feed only, the LHSV is 0.8 and the hydrogen circulation rate is 6,000 s.c.f./bbl. The charge is raised to a temperature of about 260° F., and enters the first reaction zone at a pressure of about 825 p.s.i.g. The product effluent emanates from the first reaction zone at a pressure of about 815 p.s.i.g. and a temperature of about 360° F. The temperature of the first reaction zone effluent is increased to a level of about 525° F., and is introduced into the second reaction zone under a pressure of about 800 p.s.i.g. The liquid hourly space velocity, exclusive of the recycle diluent, is 1.0, and the hydrogen circulation rate is about 9,000 s.c.f./bbl. The second reaction zone contains a catalyst of a composite of alumina, 0.375% by weight of platinum, 0.15% by weight of rhenium and 0.20% by weight of tin. The reaction product effluent is introduced, following its use as a heat-exchange medium, and further cooling to reduce its temperature to a level of 100° F., into a high-pressure separator maintained at a pressure of about 750 p.s.i.g. The normally liquid stream from the cold separator is introduced into a reboiled stripping column for hydrogen sulfide removal and depentanization. The hydrogen sulfide stripping column functions at conditions of temperature and pressure required to concentrate a $C_6$ to $C_9$ aromatic stream as a bottoms fraction. With respect to the overall product distribution, only 0.03% by weight of the charge results in light paraffinic hydrocarbons, the butanes-400° F. product being recovered in an amount of 102.45% by weight, containing 71.2% by volume of aromatics. These results are achieved with a hydrogen consumption of only 1,248 s.c.f./bbl., or 2.45% by weight. With respect to the aromatic concentrate ($C_6$–$C_9$ cut), the gravity is 50.7° API, the sulfur concentration is less than 1.0 p.p.m. by weight, and the diene value is essentially "nil."

Example III

This example is presented to illustrate still another hydrocarbon hydroprocessing scheme for the improvement of the jet fuel characteristics of sulfurous kerosene boiling range fractions. The improvement is especially noticeable in the IPT Smoke Point, the concentration of aromatic hydrocarbons and the concentration of sulfur. A two-stage process wherein desulfurization is effected in the first reaction zone at relatively mild severities which result in a normally liquid product effluent containing from about 15 to about 35 p.p.m. of sulfur by weight. Aromatic saturation is the principal reaction effected in the second reaction zone, having disposed therein a catalytic composite of alumina, a halogen component, a Group VIII noble metal component, a rhenium component and a tin component.

Suitable charge stocks are kerosene fractions having an initial boiling point as low as about 300° F., and an end boiling point as high as about 575° F., and, in some instances, up to 600° F. Exemplary of such kerosene fractions are those boiling from about 300° F. to about 550° F., from 330° F. to about 500° F., from 330° F. to about 530° F., etc. As a specific example, a kerosene obtained from hydrocracking a Mid-continent slurry oil, having a gravity of about 30.5° API, an initial boiling point of about 388° F., an end boiling point of about 522° F., has an IPT Smoke Point of 17.1 mm., and contains 530 p.p.m. of sulfur and 24.8% by volume of aromatic hydrocarbons. Through the use of the catalytic process of the present invention, the improvement in the jet fuel quality of such a kerosene fraction is most significant with respect to raising the IPT Smoke Point, and reducing the concentration of sulfur and the quantity of aromatic hydrocarbons. Specifications regarding the poorest quality of jet fuel, commonly referred to as Jet–A, Jet–A1 and Jet–B call for a sulfur concentration of about 0.3% by weight maximum (3,000 p.p.m.), a minimum IPT Smoke Point of 25 mm. and a maximum aromatic concentration of about 20.0 vol. percent.

The charge stock is admixed with recycled hydrogen in an amount within the range of from about 1,000 to about 2,000 s.c.f./bbl. This mixture is heated to a temperature level necessary to control the maximum catalyst bed temperature below about 750° F., and preferably not above 725° F., with a lower limit of about 600° F. The catalyst, a well-known desulfurization catalyst containing about 2.2% by weight of cobalt and about 5.7% by weight of molybdenum, composited with alumina is disposed in a reaction zone maintained under an imposed pressure in the range of from about 500 to about 1,100 p.s.i.g. The LHSV is in the range of about 0.5 to about 10.0, and preferably from about 0.5 to about 5.0. The total product effluent from this first catalytic reaction zone is separated to provide a hydrogen-rich gaseous phase and a normally liquid hydrocarbon stream containing 15 p.p.m. to about 35 p.p.m. of sulfur by weight. The normally liquid phase portion of the first reaction zone effluent is utilized as the fresh feed charge stock to the second reaction zone. In this particular instance, the first reaction zone decreases the sulfur concentration to about 25 p.p.m., the aromatic concentration to about 16.3% by volume, and has increased the IPT Smoke Point to a level of about 21.5 mm.

The catalytic composite within the second reaction zone comprises alumina, 0.30% by weight of platinum, 0.25% by weight of tin, 0.15% by weight of rhenium and about 0.70% by weight of combined chloride, calculated on the basis of the elements. The reaction zone is maintained at a pressure of about 400 to about 1,500 p.s.i.g., and the hydrogen circulation rate is in the range of 1,500 to about 10,000 s.c.f./bbl. The LHSV is in the range of from about 0.5 to about 5.0, and preferably from about 0.5 to about 3.0. It is preferred to limit the catalyst bed temperature in the second reaction zone to a maximum level of about 750° F. With a catalyst of this particular chemical and physical characteristics, optimum aromatic saturation, processing a feed stock containing from about 15 to about 35 p.p.m. of sulfur, is effected at maximum catalyst bed temperatures in the range of about 625° F. to about 750° F. With respect to the normally liquid kerosene fraction, recovered from the condensed liquid removed from the total product effluent, the sulfur concentration is effectively "nil." The quantity of aromatic hydrocarbons has been decreased to a level of about 1.0% by volume, or less, and the IPT Smoke Point has been increased to above 35.0 mm.

With respecto to another kerosene fraction, having an IPT Smoke Point of about 22.5 mm., an aromatic concentration of about 17.7 vol. percent and a sulfur concentration of about 22 p.p.m. by weight, the same is processed in a catalytic reaction zone at a pressure of about 850 p.s.i.g. and a maximum catalyst bed temperature of about 725° F. The LHSV is about 1.25, and the hydrogen circulation rate is about 6,000 s.c.f./bbl. The catalytic composite disposed within the reaction zone comprises alumina, 0.375% by weight of platinum, 0.20% by weight of rhenium, 0.35% by weight of tin and about 0.70% by weight of combined chloride. Following separation and distillation, to concentrate the kerosene fraction, analyses indicate that the Smoke Point has been increased to a level of about 36.0 mm., the aromatic concentration has been lowered to about 0.5% by volume and the sulfur concentration is essentially "nil."

Example IV

The last illustration of a hydrocarbon hydroprocessing scheme encompassed by my invention is one which involves hydrocracking heavy hydrocarbonaceous material into lower-boiling hydrocarbon products. In this instance, the preferred catalysts contain a tin component, a Group VIII noble metal component and a rhenium component, combined with a crystalline aluminosilicate-carrier material, preferaby faujasite, and still more preferably one which is at least 90.0% by weight zeolitic. The Group VIII noble metal component is preferably platinum and/or palladium; and, in some instances, a halogen component may be combined therewith, particularly fluorine and/or chlorine.

Most of the virgin stocks, intended for hydrocracking, are contaminated by sulfurous compounds and nitrogenous compounds, and, in the case of the heavier charge stocks, various metallic contaminants, insoluble asphalts, etc. Contaminated charge stocks are generally hydrorefined in order to prepare a charge suitable for hydrocracking. Thus, the catalytic process of the present invention can be beneficially utilized as the second stage of a two-stage process, in the first stage of which the fresh feed is hydrorefined.

Hydrocracking reactions are generally effected at elevated pressures in the range of about 800 to about 5,000 p.s.i.g., and preferably at some intermediate level of 1,000 to about 3,500 p.s.i.g. Liquid hourly space velocities of about 0.25 to about 10.0 will be suitable, the lower range generally reserved for the heavier stocks. The hydrogen circulation rate will be at least about 3,000 s.c.f./bbl., with an upper limit of about 50,000 s.c.f./bbl., based upon fresh feed. For the majority of feed stocks, hydrogen concentrations in the range of 5,000 to 20,000 s.c.f./bbl. will suffice. With respect to the LHSV, it is based upon fresh feed, notwithstanding the use of recycle liquid providing a combined liquid feed ratio in the range of about 1.25 to about 5.0. The operating temperature again alludes to the temperature of the catalyst within the reaction zone, and is in the range of about 400° F. to about 900° F. Since the principal reactions are exothermic in nature, the increasing temperature gradient, experienced as the charge stock, traverses the catalyst bed and results in an outlet temperature higher than that at the inlet to the catalyst bed. The maximum catalyst temperature should not exceed 900° F., and it is a preferred technique to limit the temperature increase to 100° F. or less.

Although amorphous composites of alumina and silica, containing from about 10.0% to about 90.0% by weight of the latter, are suitable for use in the catalystic composite employed in the present process, a preferred carrier material constitutes a crystalline aluminosilicate, preferably faujasite, of which at least about 90.0% by weight is zeolitic. This carrier material, and a method of preparing the same, have hereinbefore been described. Generally, the tin component will be used in an amount sufficient to result in a final catalytic composite containing about 0.01% to about 5.0% by weight. The Group VIII noble metal component is generally present in an amount within the range of about 0.01% to about 1.0% by weight, and may exist within the composite as a compound such as an oxide, sulfide, halide, etc. Another possible constituent of the catalyst is a halogen component, either fluorine, chlorine, iodine, bromine, or mixtures thereof. Of these, it is preferred to utilize a catalyst containing fluorine and/or chlorine. The halogen component will be composited with the carrier material in such a manner as results in a final composite containing about 0.1% to about 1.5% by weight of halogen, calculated on an elemental basis. The rhenium component is utilized in an amount of 0.01% to about 1.0% by weight.

A specific illustration of this hydrocarbon hydroprocessing technique involves the use of a catalytic composite of about 0.4% by weight of palladium, 0.7% by weight of combined chlorine, 0.8% by weight of tin and 0.20% by weight of rhenium, combined with a crystalline aluminosilicate material of which about 93.2% by weight constitutes faujasite. This catalyst is intended for utilization in the conversion of a heavy vacuum gas oil to produce maximum quantities of a heptane-390° F. gasoline boiling range fraction. The charge stock has a gravity of 22.0° API, contains 2.8% by weight of sulfur and 800 p.p.m. by weight of nitrogen, and has an initial boiling point of 600° F., a 50% volumetric distillation temperature of 820° F. and an end boiling point of 1050° F. The charge stock, an amount of 4,100 bbl./day, is initially subjected to a clean-up operation at a maximum catalyst temperature of 800° F., a combined feed ratio of 1.0, an LHSV of 0.67, with a hydrogen circulation rate of about 6,000 s.c.f./bbl. The pressure imposed upon the catalyst within the reaction zone is about 2,000 p.s.i.g. Since at least a portion of the blended gas oil charge stock will be converted into lower-boiling hydrocarbon products, the effluent from this clean-up reaction zone is separated to provide a normally liquid, 390° F.-plus charge for the hydrocracking reaction zone containing the rhenium-palladium-tin-chlorine catalyst. The pressure imposed upon the second reaction zone is about 1,950 p.s.i.g., and the hydrogen circulation rate is about 8,200 s.c.f./bbl. The charge to the second reaction zone is in an amount of about 3,540 bbl./day, providing an LHSV of 0.83. The temperature at the inlet to the catalyst bed is 600° F., and a conventional hydrogen quench stream is utilized to maintain the maximum reactor temperature at about 650° F. Following separation of the product effluent from the second reaction zone, to concentrate the desired gasoline boiling range fraction, the remaining 390° F.-plus normally liquid material, in an amount of 2,265 bbl./day is recycled to the inlet of the second reaction zone, thus providing a combined liquid feed ratio thereto of about 1.6. In the following table, there is indicated the product yield and distribution of this process. With respect to normally liquid hydrocarbons, for convenience including butanes, the yields are given in volume percent; with respect to the normally gaseous hydrocarbons, ammonia and hydrogen sulfide, the yields are given in terms of weight percent. With respect to the first reaction zone, the hydrogen consumption is 1.97% by weight of the fresh feed (1,204 s.c.f./bbl.), and for the hydrocracking reaction zone, 1.32% by weight of the fresh feed charge stock, or 804 s.c.f./bbl.

TABLE.—HYDROCRACKING PRODUCT YIELD AND DISTRIBUTION

| Component | Stage I | Stage II | Total |
|---|---|---|---|
| Ammonia | 0.10 | | 0.01 |
| Hydrogen sulfide | 2.98 | | 2.98 |
| Methane | 0.20 | | 0.20 |
| Ethane | 0.29 | 0.09 | 0.38 |
| Propane | 0.68 | 2.03 | 2.71 |
| Butanes | 2.18 | 16.19 | 18.37 |
| Pentanes | 1.43 | 14.74 | 16.17 |
| Hexanes | 1.82 | 13.12 | 14.94 |
| C$_7$-400° F | 19.04 | 58.01 | 77.05 |
| 400° F.-plus | *86.34 | | |

*Charge to Stage II.

With respect to both the butane product and pentane product, the former is indicated as being about 70.0% iso-butanes, while the latter constitutes about 80.0% iso-pentanes. An analysis of the combined pentane/hexane fraction indicates a gravity of 83.2° API, a clear research octane rating of 85.5 and a leaded research octane rating of 98.4; it will be noted that this constitutes an excellent blending component for motor fuel. The desired heptane-390° F. product indicates a gravity of 55.3. This gasoline boiling range fraction constitutes about 53.0% by volume paraffins, 39.2% by volume naphthenes and 7.8% by volume aromatic hydrocarbons. This gasoline boiling range fraction constitutes an excellent charge stock for a catalytic reforming unit to improve the motor fuel characteristics thereof.

The foregoing specification, and particularly the examples, indicates the method by which the present invention is effected, and the benefits afforded through the utilization thereof.

I claim as my invention:

1. A process for hydrocarcking a hydrocarbonaceous charge stock into lower molecular weight hydrocarbons which comprises reacting said charge stock with hydrogen, at a temperature of about 400° F. to 900° F., a pressure of about 800 to 5000 p.s.i.g., a liquid hourly space velocity of about 0.25 to 10.0 and a hydrogen concentration of about 3000 to 50,00 s.c.f./bbl., in contact with a catalytic composite of from .01 to about 1.0 wt. percent of a Group VIII noble metal component, from 0.01 to about 1.0 wt. percent of a rhenium component, from 0.01 to about 5.0 wt. percent of a tin component, and a porous carrier material, said weight percentages being on an elemental basis.

2. The process of claim 1 further characterized in that said Group VIII moble metal is platinum or palladium.

3. The process of claim 2 further characterized in that said catalytic composite is reduced and sulfided prior to contacting said charge stock.

4. The process of claim 1 further characterized in that said conditions include a pressure of from 400 to about 5,000 p.s.i.g., a liquid hourly space velocity of from 0.1 to about 10.0, a hydrogen concentration of from 1,000 to about 50,000 s.c.f./bbl. and a maximum catalyst temperature of from 200° F. to about 900° F.

5. The process of claim 2 further characterized in that said carrier material is an amorphous refractory inorganic oxide.

6. The process of claim 2 further characterized in that said carrier material is a crystalline aluminosilicate.

7. The process of claim 6 further characterized in that said crystalline aluminosilicate carrier material comprises faujasite.

8. A catalytic composite comprising a substantially pure crystalline aluminosilicate carrier material, at least about 90.0% by weight of which is zeolitic, about 0.01 to about 1.0 wt. percent of a Group VIII noble metal component, about 0.01 to about 1.0 wt. percent of a rhenium component, and from 0.01 to about 5.0 wt. percent of a tin component, said weight percentages being on an elemental basis.

9. The catalytic composite of claim 8 further characterized in that said Group VIII noble metal component is a platinum component.

10. The catalytic composite of claim 8 further characterized in that said crystalline aluminosilicate is faujasite.

References Cited

UNITED STATES PATENTS

| | | | |
|---|---|---|---|
| 3,098,030 | 7/1963 | Coonradt et al. | 208—111 |
| 3,318,802 | 5/1967 | Martin | 208—111 |
| 3,431,218 | 3/1969 | Plank et al. | 252—455 |
| 3,449,237 | 6/1969 | Jacobson et al. | 208—138 |
| 3,487,007 | 12/1969 | Mulaskey | 208—111 |

DELBERT E. GANTZ, Primary Examiner

R. M. BRUSKIN, Assistant Examiner

U.S. Cl. X.R.

252—461, 472; 208—57, 89, 217, 255; 260—667